UNITED STATES PATENT OFFICE.

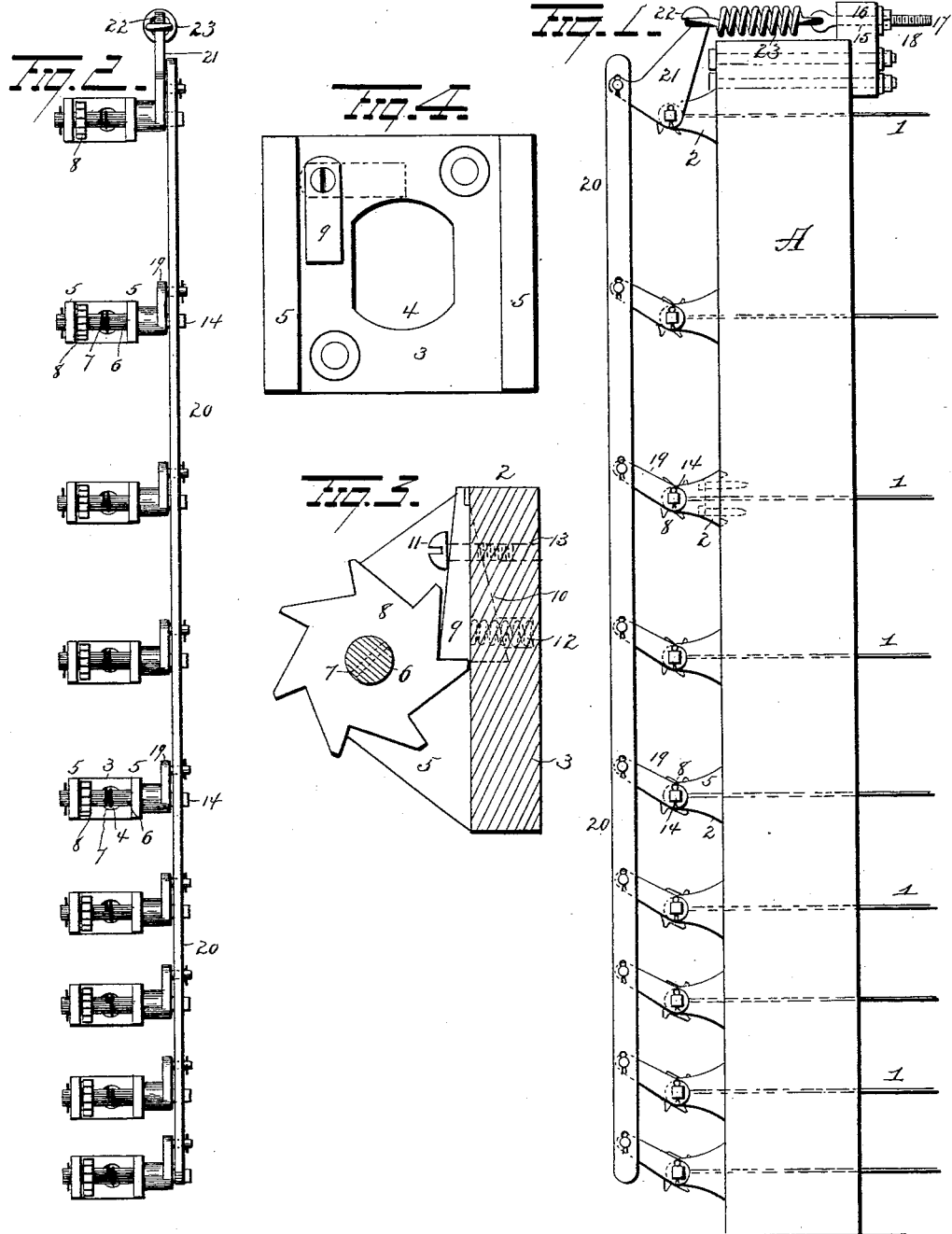

JAMES N. PARKER, OF ELKHART, INDIANA.

WIRE-STRETCHER.

SPECIFICATION forming part of Letters Patent No. 588,002, dated August 10, 1897.

Application filed March 17, 1896. Renewed May 3, 1897. Serial No. 634,968. (No model.)

*To all whom it may concern:*

Be it known that I, JAMES N. PARKER, a resident of Elkhart, in the county of Elkhart and State of Indiana, have invented certain new and useful Improvements in Wire-Stretchers; and I do hereby declare the following to be a full, clear, and exact description of the invention, such as will enable others skilled in the art to which it appertains to make and use the same.

My invention relates to an improvement in wire-stretchers for fences, the object of the invention being to provide simple and efficient means whereby fence-wires can be stretched or tightened to the desired extent and so that all the wires of the fence can be held at an equal tension and so as to allow for expansion and contraction of the wires on account of changes of temperature or yield when subjected to pressure from any cause.

With this object in view the invention consists in certain novel features of construction and combinations and arrangements of parts, as hereinafter set forth, and pointed out in the claims.

In the accompanying drawings, Figure 1 is a side view illustrating my improvements. Fig. 2 is a face view. Fig. 3 is a detail view. Fig. 4 is a view of a modification.

A represents a fence-post having holes for the passage of the fence-wires 1. A series of brackets 2 is secured to the fence-post and corresponds in number with the fence-wires, each bracket comprising a base-plate 3, having a hole 4 for the passage of the fence-wire, and outwardly-projecting arms 5, in the outer end of which a horizontally-disposed shaft or drum 6 is mounted. The shafts 6 are provided with holes 7 for the reception of the free ends of the fence-wires, and on said shafts said fence-wires are to be wound, as presently explained. A ratchet-wheel 8 is secured to each shaft 6 and adapted to be engaged by a dog 9, attached to the base-plate 3 of each bracket. Each base-plate will be made with a recess or depression 10 for the reception of the dog when the latter is depressed, and the dogs are connected with the respective base-plates by means of screws 11, the outer portions of which, immediately in rear of the heads, are made plain, and the holes in the dogs, through which said plain portions of the screws pass, are sufficiently larger than the diameter of the screws to permit the dogs to have a pivotal movement, so as to ride from tooth to tooth of the respective ratchet-wheels. Each dog will be maintained normally in engagement with the respective ratchet-wheel 8 by means of a spring 12. The screw-threaded sockets 13, into which the screws 11 enter, are made of greater depth than the length of said screws, so that when it is desired to move the dogs out of the path of the ratchet-wheels this may be accomplished by screwing said screws down deeper into their sockets.

Instead of connecting the dogs 9 with the base-plates of the brackets 2 in the manner above described, said dogs may be pivoted to the base-plates as shown in Fig. 4, in which case when it is desired to move them out of engagement with the ratchet-wheels it is simply necessary to swing them around on their pivots, so as to cause them to assume a position at right angles to their normal position, as indicated by dotted lines in Fig. 4.

When the fence-wires shall have been threaded through the holes in the post and attached to the various shafts 8, a suitable wrench will be applied successively to the squared ends 14 of said shafts and the latter turned to wind the wires thereon until they shall have been tightened to the desired extent, in which position they will be held by the ratchet devices above explained.

An arm 15 is secured to the upper end of the fence-post and projects somewhat above the same, said arm being made with a horizontal hole 16 for the accommodation of an eyebolt 17. The free end of the eyebolt is screw-threaded for the reception of a nut 18, which latter normally bears against said arm and retains the eyebolt in the position to which it may be adjusted.

When the fence-wires shall have been properly tightened, an arm 19 will be applied to the squared ends of the shafts 8, (except the top one,) and the outer ends of said arms will be pivotally connected with a common vertical bar 20. To the squared end of the upper shaft 8 a triangular lever 21 is secured, and said lever is pivotally attached to the bar 20. The upper end of the triangular lever 21 is made with a hook 22 for the reception of one end of a coiled spring 23, and the other end of said spring is attached to the eyebolt 17. The nut on the eyebolt will now be screwed up so as to move said eyebolt whereby to increase the tension of the spring 23. When the spring shall have been adjusted to the proper tension, the dogs 9 will be moved out of engagement with the ratchet-wheels 8 and the tension on the wires will be maintained by the spring 23. The tension of all the wires will therefore be uniform.

My improvements are simple in construction, cheap to manufacture, easy to construct, and effectual in all respects in the performance of their functions.

Having fully described my invention, what I claim as new, and desire to secure by Letters Patent, is—

1. The combination with fence-posts and fence-wires, of brackets secured to the posts, ratchet devices mounted on said brackets for tightening the fence-wires, arms projecting from said ratchet devices, a bar to which said arms are pivoted, a pivoted lever having a pivotal connection with said bar, and a spring connected at one end to said pivoted lever and having a connection at the other end with the fence-post, substantially as set forth.

2. The combination with a fence-post and fence-wires, of brackets secured to the fence-post, shafts mounted in said brackets and adapted to receive the fence-wires, a ratchet-wheel on each shaft, a dog to engage each ratchet-wheel, said dogs being adapted to be moved out of the path of said ratchet-wheels, arms projecting from said shafts, a bar to which said arms are pivotally connected, a pivoted lever having a pivotal connection with said bar, and a spring attached at one end to said pivoted lever and at the other end connected with the fence-post, substantially as set forth.

3. The combination with a fence-post and fence-wires, of brackets secured to the post, each bracket having a recess and a screw-threaded socket in its base-plate, a ratchet-wheel on each shaft, a dog for each ratchet-wheel, said dogs being adapted to enter the recesses in the base-plates of the brackets, screws for holding said dogs in position, said screws entering said screw-threaded sockets in the base-plate, a spring under each dog, and devices connected with said shafts for subjecting the fence-wires to a uniform tension, substantially as set forth.

4. The combination with a fence-post and fence-wires, of shafts supported by the post and adapted for the reception of the fence-wires, arms projecting from said shafts, a bar to which said arms are pivoted, a pivoted triangular lever having a pivotal connection with said bar, an arm projecting upwardly from the post and a spring connected at one end to the triangular lever and adjustably connected at the other end with said arm on the post, substantially as set forth.

5. The combination with a fence-post and fence-wires, of shafts supported by the post and adapted for the reception of the fence-wires, a bar to which said arms are pivotally connected, a pivoted triangular lever having a pivotal connection with said bar, an arm projecting upwardly from the post an eyebolt having a screw-threaded end, passing through said last-mentioned arm, a nut on said eyebolt and a spring connected at one end with said eyebolt and at the other end with said triangular lever, substantially as set forth.

In testimony whereof I have signed this specification in the presence of two subscribing witnesses.

JAMES N. PARKER.

Witnesses:
F. J. GOLDMAN,
JAS. K. GORE.